United States Patent [19]

Müeller et al.

[11] 3,757,156

[45] Sept. 4, 1973

[54] VIDEO SIGNAL BRIGHTNESS CONTROL CIRCUIT ARRANGEMENT

[75] Inventors: Dietrich Müeller, Achim; Heiner Wulf, Ritterhude, both of Germany

[73] Assignee: Fried. Krupp Gesellschaft mit beschrankter Haftung, Essen, Germany

[22] Filed: Oct. 22, 1971

[21] Appl. No.: 191,588

[30] Foreign Application Priority Data

Oct. 24, 1970 Germany .................. P 20 52 283.2

[52] U.S. Cl. ............................ 315/30, 343/100 CL

[51] Int. Cl. ............................ H01j 29/52

[58] Field of Search ................ 343/100 CL; 315/30; 356/4, 5; 325/323, 324; 324/77 H; 335/181

[56] References Cited

UNITED STATES PATENTS

| | | | |
|---|---|---|---|
| 3,295,362 | 1/1967 | Wood et al. | 343/100 CL |
| 2,956,203 | 10/1960 | Beste | 315/30 |
| 3,516,751 | 6/1970 | Fruengel | 356/4 |

*Primary Examiner*—Carl D. Quarforth
*Assistant Examiner*—J. M. Potenza
*Attorney*—George H. Spencer et al.

[57] ABSTRACT

A circuit arrangement for processing a sequence of video signals containing useful and interfering components, particularly received ranging signals, for display on a cathode-ray tube. The received video signals are fed via two parallel channels to a correlator. The video signals are unaltered in one of the channels while in the other channel the extended time average of the video signals is formed. The correlator forms the logarithm of the correlation of the two input signals thereto and the output signal thereof is used as the brightness control signal for the cathod-ray tube. A constant background brightness signal is preferably additively superimposed on the output signal from the correlator.

9 Claims, 4 Drawing Figures

VIDEO SIGNAL BRIGHTNESS CONTROL CIRCUIT ARRANGEMENT

BACKGROUND OF THE INVENTION

The present invention relates to circuit arrangement for processing a sequence of video signals containing useful and interfering components. More particularly the present invention relates to such a circuit arrangement for processing received ranging signals for the display of a panorama or partial panorama image on the screen of a cathode-ray tube.

Circuit arrangements of this type are known in which the brightness of the background and the contrast of a picture displayed on the screen of a cathode-ray tube are manually set from case to case so that luminious dots which are produced by video signals and which originate from interesting reflecting objects are recognizable as well as possible on the cathode-ray tube screen based on their differences in brightness compared to other luminous dots originating from interferences.

Fluctuations in the level of the video signals appearing during ranging often displace the recognition threshold for the signal into the interference range so that careful manual correction of the background brightness, and possibly also of the contrast, are required to always obtain a well illuminated display on the screen and thus a recognizable brighter display of the useful signals as compared to the interfering surroundings. Since the area for the recognition threshold is already left with slight fluctuations in the level of the video signals because of the limited brightness dynamic of the screen, frequent manual readjustment of the background brightness and possibly also of the contrast is inevitable to provide adaptation to the momentary state of the display. This frequent required readjustment in order to clearly display the interesting reflecting objects is both annoying and of particular disadvantage to the operator of the system.

SUMMARY OF THE INVENTION

It is therefore the object of the present invention to provide a circuit arrangement with which a fixed brightness and contrast adjustment need be made only once and which adjustment is independent of possible level fluctuations of the video signals to be displayed. An adaptation of the background brightness to the momentary video signal is thus no longer necessary since the single setting of the background brightness and of the contrast will assure optimum recognizability of the useful signal.

This is accomplished according to the present invention in that a signal processing channel for the video signals is provided which contains means for forming a signal which is an extended time average of the video signals. This signal and the video signals are fed to a correlating means for forming the logarithm of the correlation between the video signals and the output signal of the signal processing channel. The output signal from the correlator is then fed to the cathode-ray tube and serves as the brightness control signal therefor.

In this circuit arrangement according to the present invention, the means for forming the signal which is the extended time average of the video signals derives from the sequence of video signals consisting of useful and interfering components, by averaging their useful components, an output signal which substantially corresponds to the interfering component of the video signals. According to one embodiment of the correlating means, the output signal from the signal processing channel is then directly correlated with the momentary video signal itself, and the logarithm of this correlation, which is thus substantially a measure for the signal to noise ratio of the video signals, is then formed and used for the brightness control signal of the cathode-ray tube. As a result of using a brightness control signal produced by a correlation of the useful and interfering components of the video signals, the display on the cathode-ray tube takes place independent of the absolute level and of level fluctuations of the video signals. A background brightness signal and thus a background brightness for the display is settable independently of the video signal level and is added to the logarithm of the correlation, i.e. the brightness control signal. This sum of the brightness control signal and the background brightness signal results in the control signal which is effective at the cathode-ray tube.

An evaluation of the display of panorama or partial panorama images on the screen of the cathode-ray tube can then easily by accomplished inter alia, by the operator. Since all useful signals which are displayed have been correlated with the momentary interfering surroundings, and their logarithm has then been formed and thus the recognizability of the useful signals is always independent of their own momentary absolute level, the operator can make a direct conclusion from the brightness intensity of the luminous dots on the screen with regard to the signal to noise ratio due to the fact that the control characteristic of cathode-ray tubes is exponential. That is, luminous dots of great brightness indicate a good signal to noise ratio with respect to the reflection of this interesting object, while luminous dots of lower brightness indicate that the interference component of the video signal is too large compared to the useful component.

Forming the logarithm of the correlation also compresses the dynamic of the signal to be displayed so that the display range which is determined by the relatively limited brightness dynamic of the cathode-ray tube is well utilized.

According to a preferred modification of the basic concept of the present invention, the correlator includes a pair of logarithm stages which separately form the logarithm of the video signal itself and the output signal of the signal processing channel and then the logarithm ratio of useful to interfering components of the video signals is derived. This logarithm ratio signal is utilized for the brightness control of the cathode-ray tube. This arrangement is particularly favorable since the logarithm of the correlation may then be derived by a simple difference formation of the two signal logarithms rather than by the relatively complicated quotient formation of the signals themselves and subsequent forming of the logarithm.

The particular advantage of the present invention for displaying a panorama or partial panorama picture on the screen of the cathode-ray tube lies in the simple manner of operation of the system since only useful signals produced by interesting reflecting objects are displayed with reference to the interfering surroundings, and the absolute level, as well as fluctuations in the level of the video signals become ineffective for the display. Moreover, the circuit arrangement according to the present invention provides the operator with the opportunity to evaluate the video signals based solely on the optical display on the screen, i.e. according to the momentary brightness intensities, which is not possible with the prior art arrangements described in the introductory paragraphs.

DESCRIPTION OF THE PREFERRED EMBODIMENTS

Figure 1:
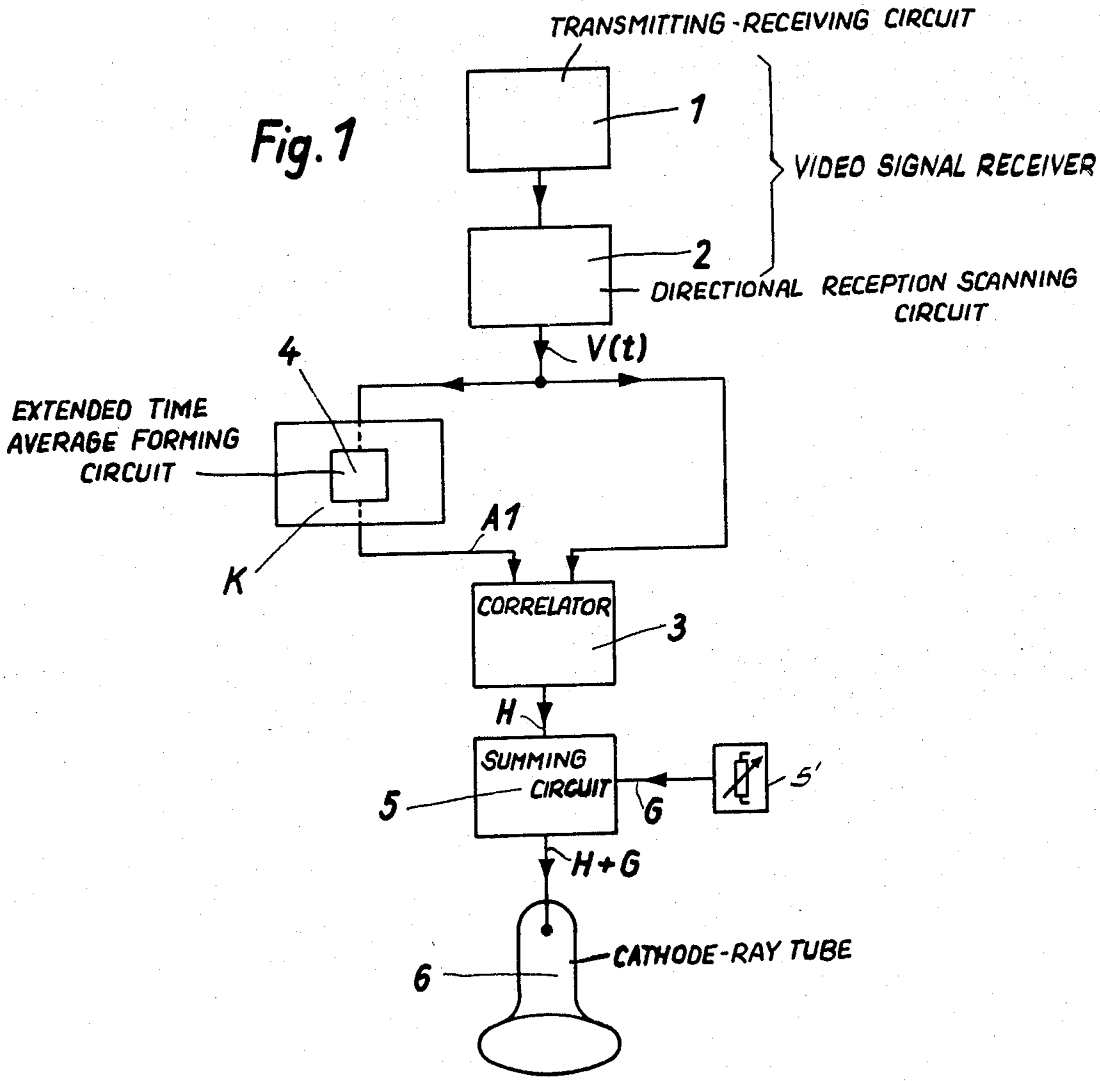
FIG. 1 is a basic block diagram for the circuit arrangement according to the invention.
Figure 4:
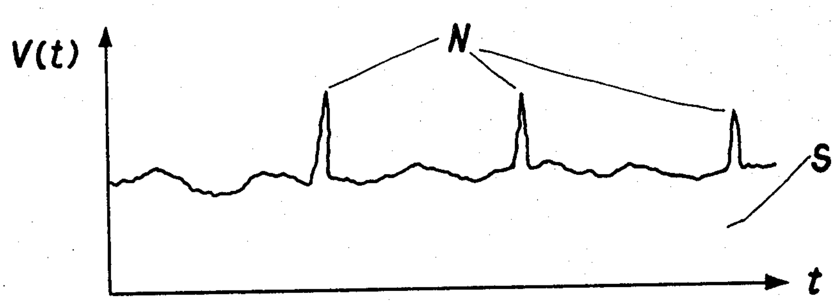
FIG. 4 is a basic representation of the time sequence of video signals to be processed by the circuit according to the invention.

Referring now to FIG. 1 there is shown only the portions of a reflected beam ranging system which are important for the display of a panorama or partial panorama picture. A transmitting-receiving circuit 1 with subsequently connected directional reception scanning circuit 2 (see, e.g., U.S. Pat. No. 3,568,141) furnishes at its output amplitude modulated direct voltage video signals. As shown in FIG. 4, these video signals V (t), which consist of useful and noise components, contain permanently present noise components S having short-time useful components N superimposed thereon. According to the invention, the video signals V (t) appearing at the output of directional reception scanning circuit 2 are fed to one input of correlator 3 and to a signal processing channel K where they are converted to an output signal A1.

The signal processing channel K comprises an extended time average forming circuit 4 in which the video signals V(t) are integated over such a long period of time that the output signal A1 substantially corresponds only to the noise component S. This results since the integration component of the useful component N becomes negligibly small during extended time integration. The output of the extended time average forming circuit 4 is connected to the other input of the correlator 3.

In the correlator 3, the logarithm of the correlation of the video signals V(t) with reference to its noise background is formed and the output signal thereof is fed to the cathode-ray tube 6 as the brightness control signal H. Connected between the output of correlator 3 and the cathode-ray tube 6 is a summing circuit 5 wherein a variable background brightness signal G, produced, e.g., in a voltage generator 5'is additively superimposed on the brightness control signal H. The control signal H + G which is effective for controlling the brightness of the cathode-ray tube 6 assures optimum recognizability of the interesting reflecting objects.

Figure 2:
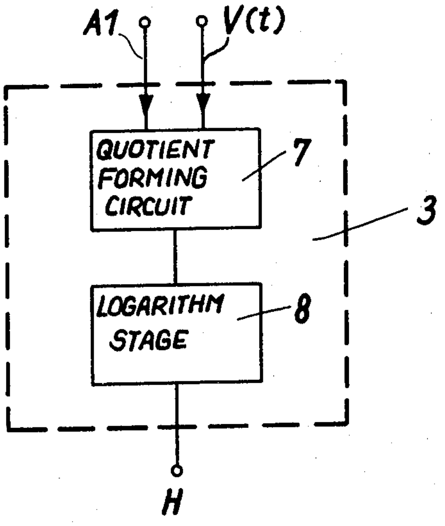
FIG. 2 is a block circuit diagram illustrating the embodiment of the correlator of the circuit of FIG. 1.

One embodiment of the correlator 3 is shown in FIG. 2. In a quotient forming circuit 7 the video signals V(t) are correlated with the output signal A1. A logarithm forming stage 8 is connected to the output thereof and produces the brightness control signal H, i.e., the logarithm of the ratio of useful and noise components N and S of the video signals V(t), as its output. An example of the quotient forming circuit 7 is shown using conventional circuit techniques in the application report "Schaltbeispiele: 100 typische Schaltungen mit Halbleiterbau-elemente" of deutsche ITT Industries GmbH, printed in 1967, application No. 93 and 94. The logarithm forming stage 8 is for instance in known manner an amplifier with a special feedback to produce a logarithmic overall characteristic. Another realization of a circuit for producing the logarithm of a ratio is shown using, integrated circuit techniques the data sheet "models 4357/4358" of Teledyne Philbrick Nexus, "printed in U.S.A. 10M-3/70".

Figure 3:
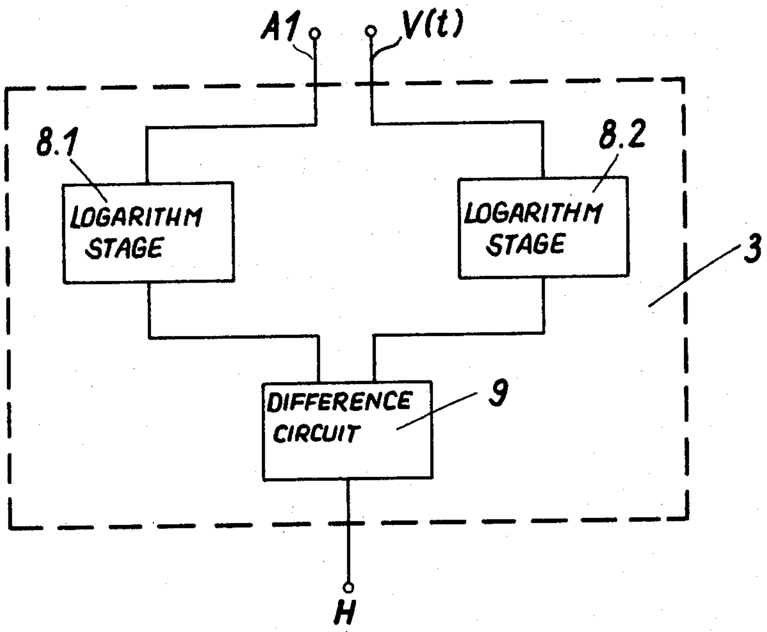
FIG. 3 is a block circuit diagram illustrating an alternative embodiment of the correlator of FIG. 1.

Instead of the correlating arrangement of FIG. 2, the correlator 3 may advantageously be realized by the alternate embodiment shown in FIG. 3. According to this embodiment, a pair of logarithm forming stages 8.1 and 8.2 is provided to whose inputs are fed the output signal A1 and the video signals V(t) respectively. The outputs of the logarithm forming stages are connected to difference circuit 9 wherein these signal logarithms are deducted from one another so that the brightness control signal H results at the output of circuit 9.

In this embodiment of the correlator 3, the technically complicated quotient forming circuit 7 is not required whereas the logarithm forming steps 8.1 and 8.2 can be easily constructed from known circuits with logarithm characteristics and the difference circuit 9 may simply consist of a differential amplifier.

The present invention for displaying a panorama or partial panorama image on the screen of a cathode-ray tube is conceived for visual evaluation by the operator. Electronic scanning of the screen by means of photosensitive components or data evaluation of the logarithm of the correlation of useful and noise components of the video signals is also advantageously possible.

It will be understood that the above description of the present invention is susceptible to various modifications, changes and adaptations, and the same are intended to be comprehended within the meaning and range of equivalents of the appended claims.

We claim:

1. A circuit arrangement for processing a sequence of received video signals containing useful and noise components, particularly received ranging signals, for display of a panorama or partial panorama image on the screen of a cathode-ray tube, comprising: a video signal receiver; a signal processing means coupled to the output of said receiver for providing an output signal which is the extended time average of the received video signals (V(t)); correlating means, responsive to the output signal from said receiver and the output signal of said signal processing means, for providing an output signal (H) which is the logarithm of the quotient of said video signals (V(t)) and said output signal (A1) from said signal processing means; and means connecting the output of said correlating means to the brightness control of said cathode-ray tube whereby said output signal (H) serves as the brightness control signal for said cathode-ray tube.

2. The circuit arrangement defined in claim 1 wherein said received video signals are ranging signals; wherein a directional receiving scanning circuit means is provided whose input is connected to the output of a transmitting-receiving circuit and at whose output said video signals appear as amplitude modulated direct voltage signals, the output of said direction scanning circuit means being connected to the input of said signal processing means and one input of said correlating means.

3. The circuit arrangement defined in claim 1 wherein said means for connecting said output signal (H) to the brightness control of said cathode-ray tube includes means for additively superimposing an adjustable background brightness signal (G) on said brightness control signal (H).

4. The circuit arrangement defined in claim 1 wherein said correlating means comprises: quotient forming means for forming an output signal which is the quotient of said video signal (V(t)) and said output signal (A1) from said signal processing means; and, a logarithm forming stage connected to the output of said quotient forming means.

5. The circuit arrangement defined in claim 1 wherein said correlating means comprises: first and second logarithm forming stages, one of said logarithm forming stages having its input connected to the output of said signal processing means and the other of said logarithm forming stages having its input connected to the output of said receiver; and, a difference circuit connected to the outputs of said first and second logarithm forming stages.

6. The circuit arrangement defined in claim 2 wherein said means for connecting said output signal (H) to the brightness control of said cathode-ray tube includes means for additively superimposing an adjustable background brightness signal (G) on said brightness control signal (H).

7. The circuit arrangement defined in claim 6 wherein said correlating means comprises: quotient forming means for forming an output signal which is the quotient of said video signal (V(t)) and said output signal (A1) from said signal processing means; and, a logarithm forming stage connected to the output of said quotient forming means.

8. The circuit arrangement defined in claim 6 wherein said correlating means comprises: first and second logarithm forming stages, one of said logarithm forming stages having its input connected to the output of said signal processing means and the other of said logarithm forming stages having its input connected to the output of said directional receiving scanning circuit; and, a difference circuit connected to the outputs of said first and second logarithm forming stages.

9. The circuit arrangement defined in claim 1 wherein said signal processing means includes means for integrating said video signals over an extended period of time.

* * * * *

UNITED STATES PATENT OFFICE
CERTIFICATE OF CORRECTION

Patent No. 3,757,156 Dated September 4th, 1973

Inventor(s) Dietrich Müller and Heiner Wulf

It is certified that error appears in the above-identified patent and that said Letters Patent are hereby corrected as shown below:

In the heading of the patent, line 3, change "Müeller" to --Müller--. In the Abstract, line 11, change "cathod" to --cathode--. Column 1, line 5, after "to" insert --a--; line 15, change "luminious" to --luminous--. Column 2, line 23, change "by" (first occurrence) to --be--. Column 3, line 8, after "block" insert --circuit--; line 38, change "integated" to --integrated--. Column 4, line 8, after "techniques" insert --in--; line 23, change "steps" to --stages--.

Signed and sealed this 19th day of March 1974.

(SEAL)
Attest:

EDWARD M. FLETCHER, JR.
Attesting Officer

C. MARSHALL DANN
Commissioner of Patents